(12) United States Patent
Shelton (10) Patent No.: US 10,309,554 B2
(45) Date of Patent: Jun. 4, 2019

(54) CLAMP DEVICE FOR CABLE TRAY ASSEMBLY

(71) Applicant: Cooper Technologies Company, Houston, TX (US)

(72) Inventor: Travis Shelton, Edwardsville, IL (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 14/772,918

(22) PCT Filed: Dec. 27, 2013

(86) PCT No.: PCT/US2013/078028
§ 371 (c)(1),
(2) Date: Sep. 4, 2015

(87) PCT Pub. No.: WO2014/137461
PCT Pub. Date: Sep. 12, 2014

(65) Prior Publication Data
US 2016/0018026 A1 Jan. 21, 2016

Related U.S. Application Data

(60) Provisional application No. 61/774,245, filed on Mar. 7, 2013.

(51) Int. Cl.
*F16L 3/26* (2006.01)
*H02G 3/00* (2006.01)
(Continued)

(52) U.S. Cl.
CPC ............. *F16L 3/26* (2013.01); *F16M 13/022* (2013.01); *H02G 3/263* (2013.01); *F16B 5/02* (2013.01); *F16B 5/0614* (2013.01); *H02G 3/0456* (2013.01)

(58) Field of Classification Search
CPC ......... F16L 3/26; F16M 13/022; H02G 3/263; H02G 3/0456; H02G 3/30; H02G 3/32;
(Continued)

(56) References Cited

U.S. PATENT DOCUMENTS 1,073,082 A * 9/1913 Barbour ................ E04F 13/045
248/228.7
3,521,843 A * 7/1970 Ogle ......................... F16L 3/26
174/68.3

(Continued)

OTHER PUBLICATIONS

International Search Report and Written Opinion for PCT/US2013/078028, dated Apr. 29, 2014, 12 pages, Alexandria, Virginia.

*Primary Examiner* — Christopher Garft
(74) *Attorney, Agent, or Firm* — Stinson Leonard Street LLP (57) ABSTRACT

A clamp device includes a clamping plate having a first side portion that is sized and shaped for reception into a channel defined by a bottom channel portion of one of the rails of the cable tray. The clamping plate has a second side portion configured for fastening to a cable tray support such that the bottom channel portion of the rail is clamped between the clamping plate and the cable tray support. The use of the clamp device increases the load-bearing capacity of the cable tray assembly over an identical cable tray that does not include the clamping plate.

9 Claims, 11 Drawing Sheets

(51) Int. Cl.
  *F16M 13/02* (2006.01)
  *H02G 3/04* (2006.01)
  *F16B 5/02* (2006.01)
  *F16B 5/06* (2006.01)

(58) Field of Classification Search
  CPC .. H02G 3/0608; H02G 3/0406; H02G 3/0437; F16B 5/0614
  USPC ........................................................ 248/228.1
  See application file for complete search history.

(56) References Cited

U.S. PATENT DOCUMENTS

| | | | | |
|---|---|---|---|---|
| 3,915,420 A * | 10/1975 | Norris | ............... | H02G 3/0456 248/58 |
| 3,960,350 A * | 6/1976 | Tardoskegyi | ............ | F16L 3/14 248/589 |
| 4,046,343 A * | 9/1977 | Kambara | ............ | H02G 3/0418 248/49 |
| 4,232,845 A * | 11/1980 | Turner | ............ | F16L 3/26 174/101 |
| 4,789,286 A * | 12/1988 | Laput | ............ | F16B 7/044 248/296.1 |
| 5,100,086 A * | 3/1992 | Rinderer | ............ | H02G 3/263 248/49 |
| 5,169,099 A * | 12/1992 | Yang | ............ | H02G 3/0456 248/49 |
| 5,242,137 A * | 9/1993 | Yang | ............ | H02G 3/0456 248/49 |
| 5,316,244 A * | 5/1994 | Zetena, Jr. | ............ | G02B 6/4459 174/95 |
| 5,372,341 A * | 12/1994 | Witherbee | ............ | H02G 3/263 248/49 |
| 5,580,014 A * | 12/1996 | Rinderer | ............ | H02G 3/0456 174/68.1 |
| RE35,479 E | 3/1997 | Witherbee et al. | | |
| 5,769,365 A * | 6/1998 | Onishi | ............ | F16L 3/04 248/223.41 |
| 5,820,322 A * | 10/1998 | Hermann | ............ | F16B 37/045 411/85 |
| 6,000,187 A * | 12/1999 | Shimizu | ............ | F16L 3/26 248/49 |
| 6,086,032 A * | 7/2000 | van Leeuwen | ............ | E04B 9/18 248/226.11 |
| 6,313,405 B1 * | 11/2001 | Rinderer | ............ | H02G 3/0456 174/68.3 |
| 6,483,026 B1 * | 11/2002 | Snider, Jr. | ............ | H02G 3/0456 174/496 |
| 6,520,357 B1 * | 2/2003 | Kautz | ............ | A47B 96/061 211/151 |
| 7,053,300 B2 * | 5/2006 | Denier | ............ | H02G 3/18 174/50 |
| 7,763,800 B2 * | 7/2010 | Lesniak | ............ | H02G 3/30 174/480 |
| 8,459,604 B2 * | 6/2013 | Smith | ............ | H02G 3/0608 248/300 |
| 8,540,090 B2 * | 9/2013 | Caveney | ............ | H02G 3/0608 211/119 |
| 9,166,390 B2 * | 10/2015 | Dean | ............ | H02G 3/0456 |
| 9,200,729 B2 * | 12/2015 | Hobbs | ............ | F16L 3/006 |
| 2003/0116682 A1 * | 6/2003 | Finco | ............ | H02G 3/0443 248/49 |
| 2003/0150968 A1 * | 8/2003 | Garassino | ............ | H02G 3/263 248/220.22 |
| 2003/0156892 A1 * | 8/2003 | Finco | ............ | H02G 3/0443 403/110 |
| 2004/0104322 A1 * | 6/2004 | Hennequin | ............ | H02G 3/0443 248/241 |
| 2006/0038091 A1 * | 2/2006 | Winn | ............ | H02G 3/0443 248/49 |
| 2011/0076094 A1 * | 3/2011 | Cardin | ............ | F16L 3/26 403/309 |
| 2012/0211115 A1 * | 8/2012 | Straughn | ............ | F16L 3/26 138/103 |
| 2012/0235010 A1 * | 9/2012 | Meredith, Jr. | ............ | H02G 3/263 248/500 |
| 2012/0315431 A1 * | 12/2012 | Cetiner | ............ | B64C 1/061 428/81 |
| 2016/0006227 A1 * | 1/2016 | Tally | ............ | H02G 3/0608 248/49 |
| 2016/0076672 A1 * | 3/2016 | Tally | ............ | F16B 7/0486 248/58 |

\* cited by examiner

CLAMP DEVICE FOR CABLE TRAY ASSEMBLY

FIELD OF THE INVENTION

The present invention generally relates to a clamp device for a cable tray assembly.

BACKGROUND OF THE INVENTION

Cable tray is used by industry to support electrical cable. A length or section of cable tray comprises a pair of side rails connected by cable-supporting rungs extending between the rails at intervals along the tray. The side rails are typically made from sheet metal of a particular gauge (i.e., thickness). Typically, supports, such as trapeze supports, are installed at regular intervals of the cable tray run.

Cable trays are rated according to their load-bearing capacities. For example, the International Electrotechnical Commission (IEC) has a standard IEC 61537 to determine the load-bearing capacity of a cable tray. In general, the rated load-bearing capacity of a cable tray is the load on the cable tray that deflects the cable tray $1/100^{th}$ of the span length using one of a number of predefined test methods, such as type II test. For example, using a cable tray having a span of 6 m during the type II test, the load on the cable tray that causes the cable tray to deflect 60 mm ($1/100^{th}$ of 6 m) is the rated load-bearing capacity of that specific tray.

One way to increase load-bearing capacity for particular cable tray is to increase the thickness or gauge of the rails. However, this approach increases both the weight and the cost of the cable tray.

SUMMARY OF THE DISCLOSURE

It is an object of the present disclosure to increase a load-bearing capacity of a cable tray without increasing the thickness or gauge of the rails. This object is accomplished through the use of a clamp device including a clamping plate having a first side portion that is sized and shaped for reception into a channel defined by a bottom channel portion of one of the rails of the cable tray. The clamping plate has a second side portion configured for fastening to a cable tray support such that the bottom channel portion of the rail is clamped between the clamping plate and the cable tray support. The use of the clamp device increases the load-bearing capacity of the cable tray over an identical cable tray that does not include the clamping plate.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
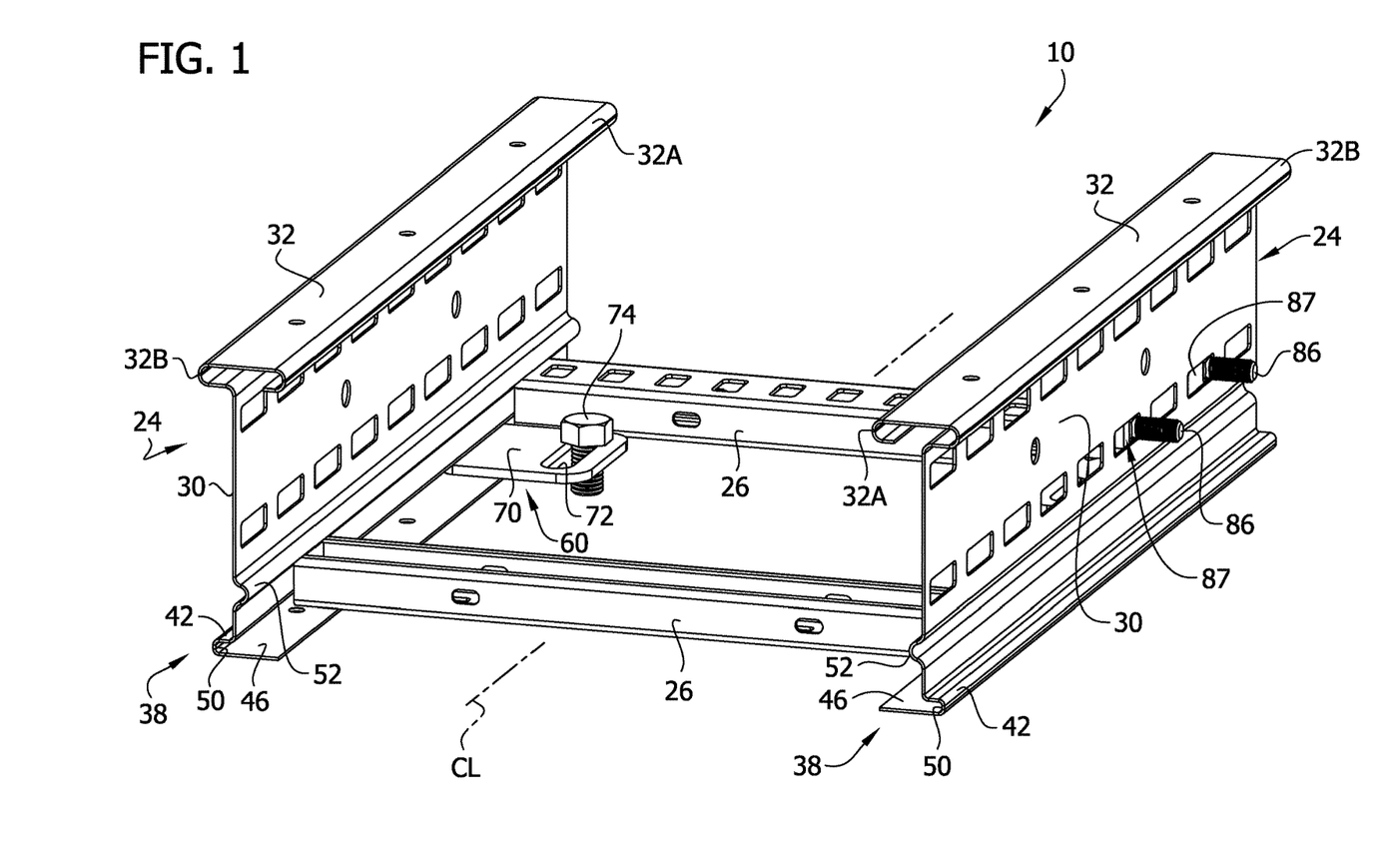
FIG. 1 is a left isometric view of a cable tray assembly including first and second clamp devices, the first clamp device being visible and the second clamp device being hidden from view.
Figure 2:
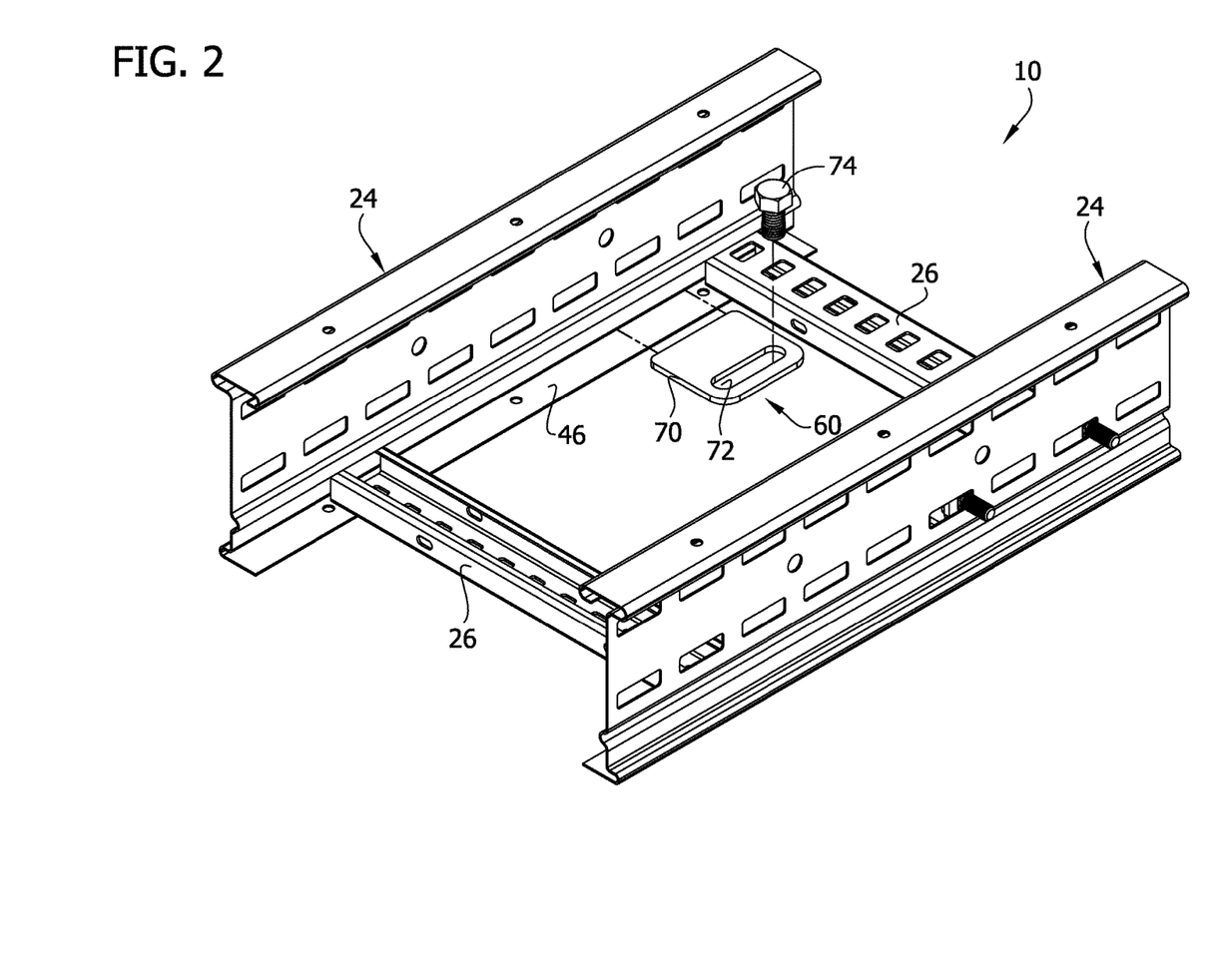
FIG. 2 is similar to FIG. 1 with the first clamp device shown separated from the cable tray assembly.
Figure 6:
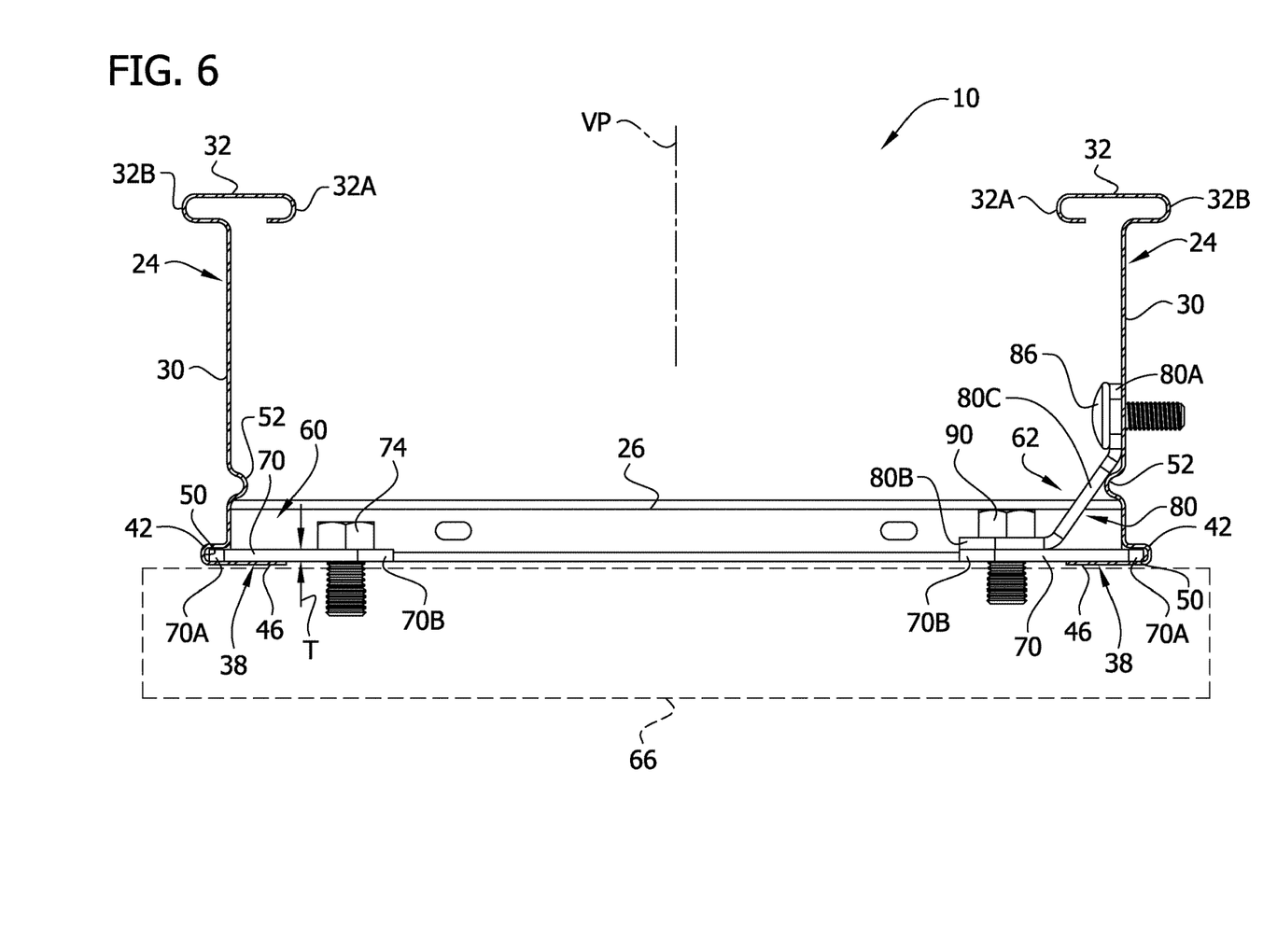
FIG. 6 is a cross section of the cable tray assembly taken in the plane defined by the line 6-6 in FIG. 5.

FIGS. 1-6 illustrate a cable tray assembly, more specifically a ladder cable tray assembly, generally indicated at reference numeral 10. Referring to FIGS. 1 and 6, the ladder cable tray assembly 10 includes two parallel rails, each generally indicated by 24, extending lengthwise of the cable tray assembly (a centerline $C_L$ extending lengthwise of the cable tray assembly is shown in FIG. 1) and forming sides of the cable tray assembly. A plurality of cable-supporting rungs 26 extend between the rails 24 at intervals spaced lengthwise of the rails. Together, the rails 24 and the rungs 26 form a cable tray of the assembly. Each rail 24 comprises a generally vertical web 30, an upper crown 32 at the upper end of the web, and a bottom channel section, generally indicated at 38, at a lower end of the web. The upper crown 32 defines inboard and outboard flanges, 32A, 32B, respectively. The bottom channel section 38 has a heel portion 42 projecting laterally outward (i.e., in an outboard direction relative to the rail) from the web 30 and a generally horizontal toe portion 46 projecting laterally inward (i.e., in an inboard direction relative to the rail) from the heel portion to a location inboard or inward of the web 30. The heel and toe portions 42, 46, respectively, define a channel 50 extending lengthwise of the rail 24 and facing inboard or toward the centerline $C_L$. The web 30 defines a bead 52 (or indentation) extending in the inboard direction lengthwise of the rail 24. A vertical gap between the bead 52 and the toe portion 46 receive ends of the rungs 26. The rungs 26 may be secured (e.g., by welding) to inboard portions of the rails 24. In one embodiment, rails 24 are formed from 1.2 mm sheet metal (e.g., 304 or 316 stainless steel). The rails 24 may be formed from sheet metal of other thicknesses.

Referring to FIG. 6, the illustrated cable tray assembly 10 further includes a first and second clamp devices, generally indicated at 60, 62, respectively, for clamping the bottom channel sections 38 of the rails 24 to a cable tray support 66 (e.g., a strut, a trapeze support, etc.) opposing lower surfaces of the channel sections. It is understood that the use of two illustrated clamp devices 60, 62 with the same cable tray assembly is for illustrative purposes, and although both clamp devices can be used with the same cable tray assembly, it is contemplated that in most installations only one of the clamp device types may be used with a single cable tray assembly. In one embodiment, such as shown best in FIG. 5, the clamp devices 60, 62 may include pairs of clamp devices, where each pair of clamp devices includes one clamp device on one rail 24 and an opposing clamp device of the same type on the other rail.

Figure 7:
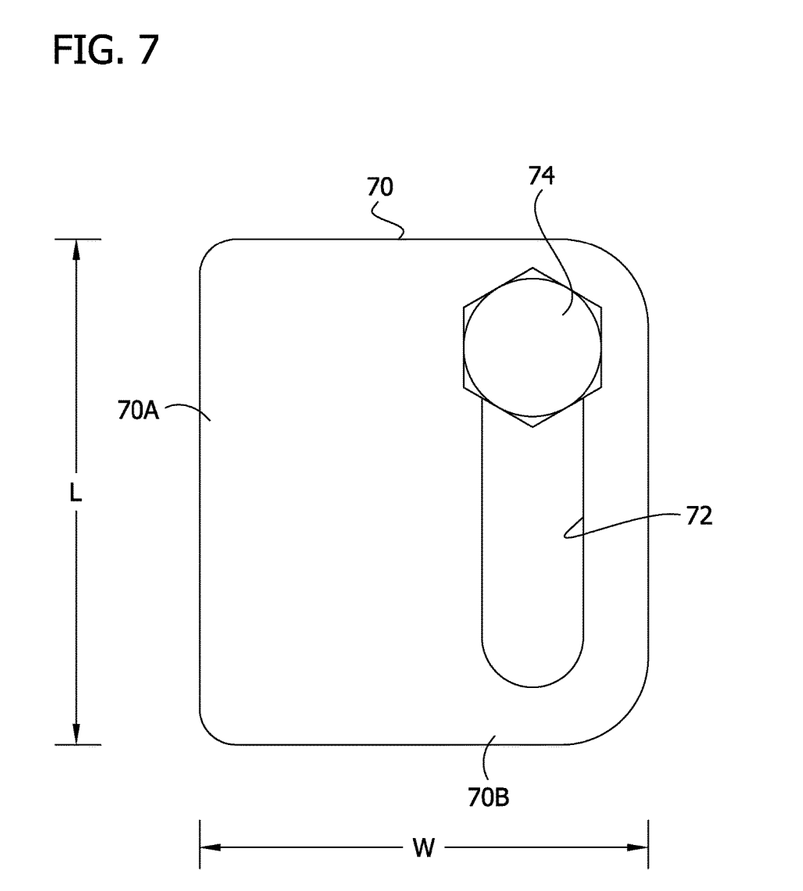
FIG. 7 is an enlarged top plan view of the first clamp device.

Referring to FIGS. 6 and 7, the first clamp device 60 includes a clamping plate 70 having a first side portion 70A sized and shaped for reception in the channel 50 and a second side portion 70B extending toward the centerline between the rails 24, inward of the bottom channel section 38. As shown in FIGS. 1, 2, 5, 6 and 7, the second side portion 70B defines a fastener opening 72 (e.g., a slot-shaped opening extending lengthwise of the rails 24) through which a fastener 74 (e.g., a bolt) extends for securing the clamping plate to the cable tray support 66. With the first side portion 70A received in the channel 50 and the fastener 74 extending through the fastener opening 70B and fastened to the cable tray support 66 (FIG. 6), the bottom channel section 38 of the corresponding rail 24 is clamped between the clamping plate 70 and the cable tray support. It is understood that the clamping plate 70 may include more than one fastener opening 72 and more than one fastener 74.

Figure 9:
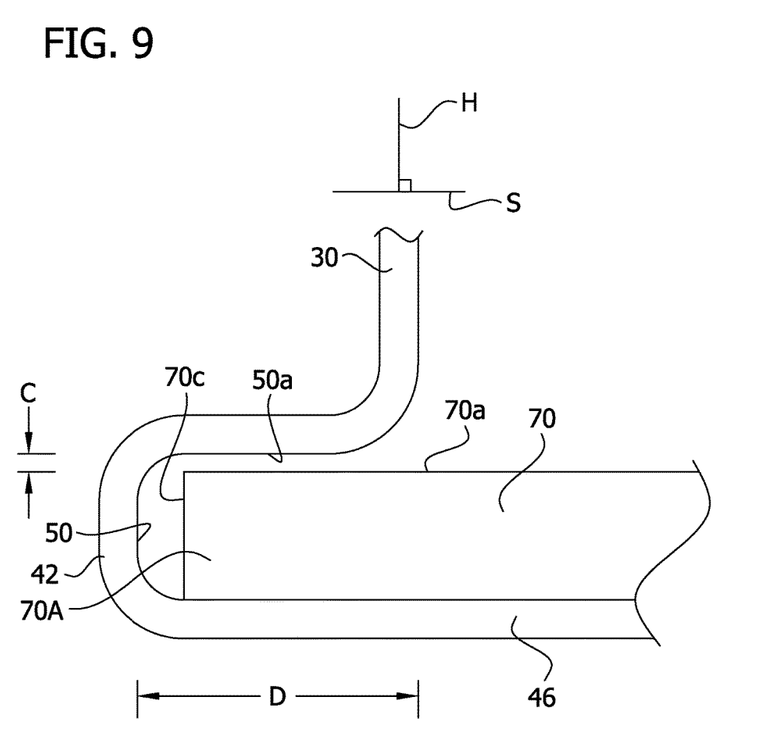
FIG. 9 is an enlarged, fragmentary view of FIG. 6 showing a clamping plate of the first clamp device received in a channel of a rail of the cable tray assembly.

The clamping plate 70 may have a uniform thickness T, as shown in FIG. 6, measuring from about 3.5 mm to about 4.2 mm, such as about 4.0 mm, so that the first side portion 70A fits snugly, and/or has an interference fit, within the channel 50. For example, as shown in FIG. 9, a clearance C between an upper surface 70a of the clamping plate 70 and the inner surface 50a of the upper wall of the channel 50 may be between about 0.01 mm and about 1.70 mm. Alternatively, the clamping plate 70 may have a non-uniform thickness (not shown), with the first side portion 70A having a thickness from about 3.5 mm to about 4.2 mm, such as about 4.0 mm, and/or a clearance C between the upper surface 70a of the clamping plate 70 and the inner surface 50a of the upper wall of the channel 50 between about 0.01 mm and about 1.70 mm. As shown in FIG. 7, the clamping plate 70 may have a longitudinal dimension L (e.g., a length), which extends lengthwise of the cable tray assembly 10, measuring from about 65 mm to about 75 mm, such as about 70 mm, and a transverse dimension W (e.g., a width) measuring from about 60 mm to about 65 mm, such as about 62 mm. In the illustrated embodiment, when the clamping plate 70 is secured to the support 26, the terminal end 70c of the clamping plate is at or extends past the mid-point of a depth D (FIG. 9) of the channel 50, and in one example, the terminal end is at or extends past ¾ of the depth of the channel. The clamping plate 70 may be formed from a generally rigid material, such as metal (e.g., 304 or 316 stainless steel, or other metal).

In one embodiment of a method of use, a plurality of first clamp devices 60 clamp both rails 24 of the cable tray assembly 10 to the cable tray support 66 at uniform intervals lengthwise of the cable tray assembly. For example, the first clamp devices 60 may be spaced at uniform intervals measuring about 3 m to 6 m lengthwise of the corresponding rail 24. The first clamp devices 60 may be spaced at other uniform intervals or at non-uniform intervals lengthwise of the rail 24. In one embodiment, the first clamp devices 60 may be spaced at intervals sufficient to increase the load-bearing capacity of the cable tray assembly 10 compared to an identical cable tray assembly that does not include the first clamp devices. The clamp device 60 increases the load-bearing capacity of the cable tray assembly 10 in two ways: 1) the clamping plates 70, by virtue of the clamping plates being received in the channel 50, inhibit crushing of the bottom channel section 38 (i.e., narrowing of the channel 50) when a load is applied to the cable tray assembly; and 2) the clamping plates, by virtue of the clamping plates being secured to the supports 26, rigidify the rails to retain the heightwise axis H (FIG. 9) of the rails (e.g., vertical axes) at orthogonal or perpendicular angles relative to the plane S (FIG. 9) in which the supports 66 lie (e.g., a horizontal plane extending between the two rails). More-over, the clamping plates 70 are retained in the channels 50 and are inhibited from slipping out of the channels by virtue of the clamping plates being fastened to the supports 66.

In one example, a cable tray assembly 10 constructed according to the principles of the present disclosure included the rails 24 of 316 stainless steel having a thickness of 1.2 mm, the rungs 26 spaced apart at uniform intervals of about 300 mm, and the first clamp devices 60 spaced apart at uniform intervals of about 3 m. This cable tray assembly was rated to have a load-bearing capacity of 340 kg/m using IEC 61537 test type II. An identical cable tray assembly that did not include the first clamp devices 60 was rated to have a load-bearing capacity of 250 kg/m using IEC 61537 test type II.

Figure 3:
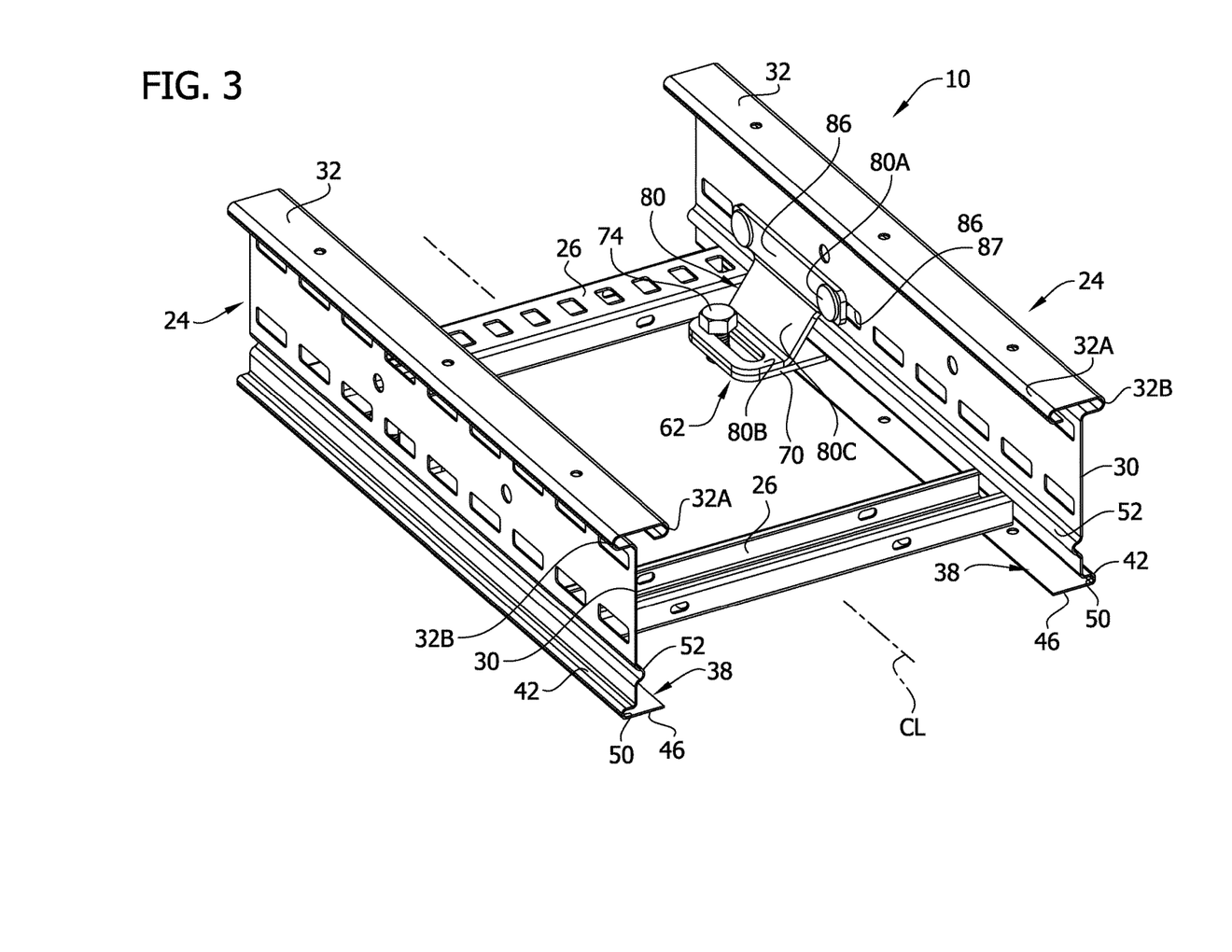
FIG. 3 is a right isometric view of the cable tray assembly, the second clamp device being visible and the first clamp device being hidden from view.
Figure 4:
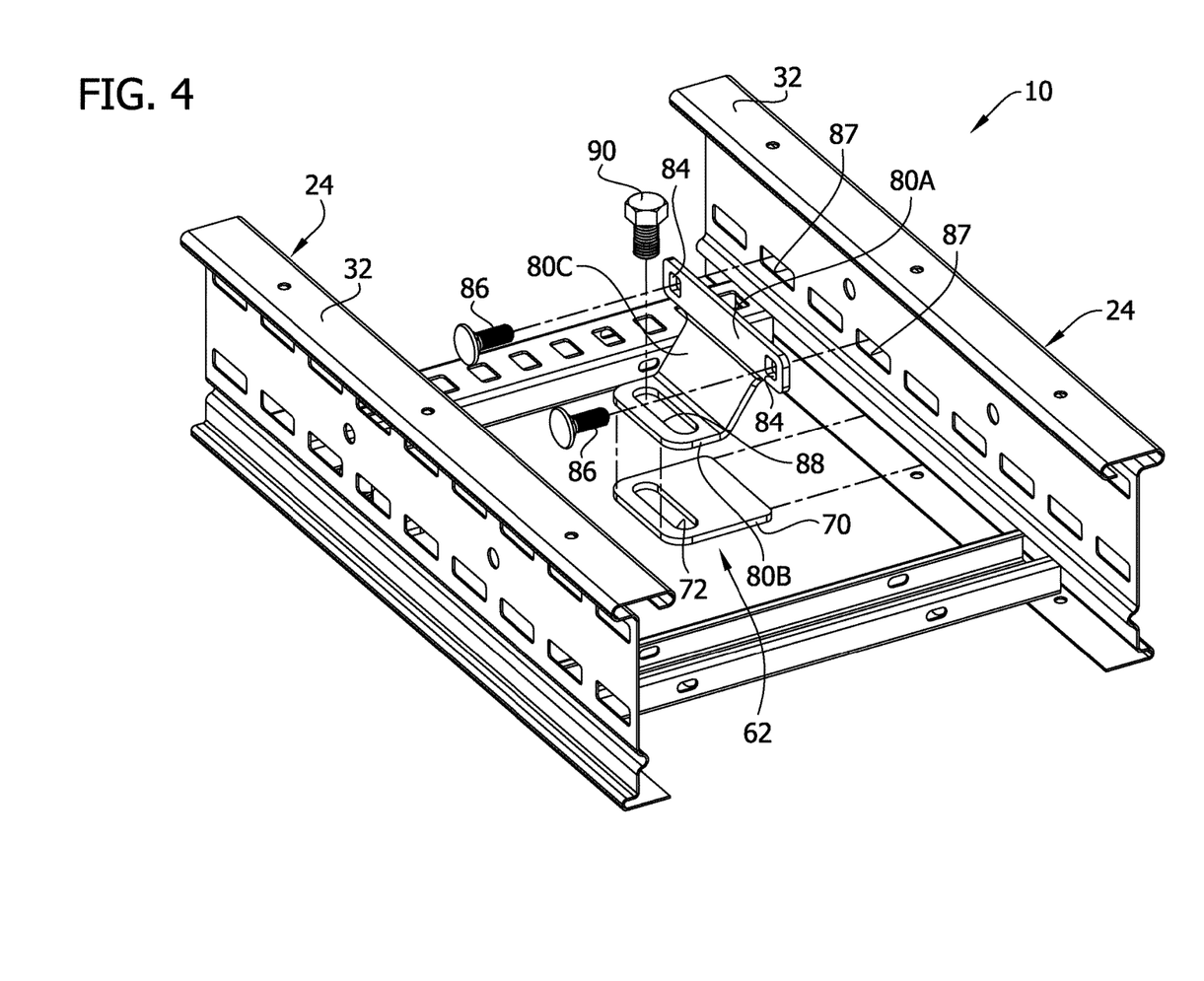
FIG. 4 is similar to FIG. 3 with the second clamp device shown separated from the cable tray assembly.
Figure 5:
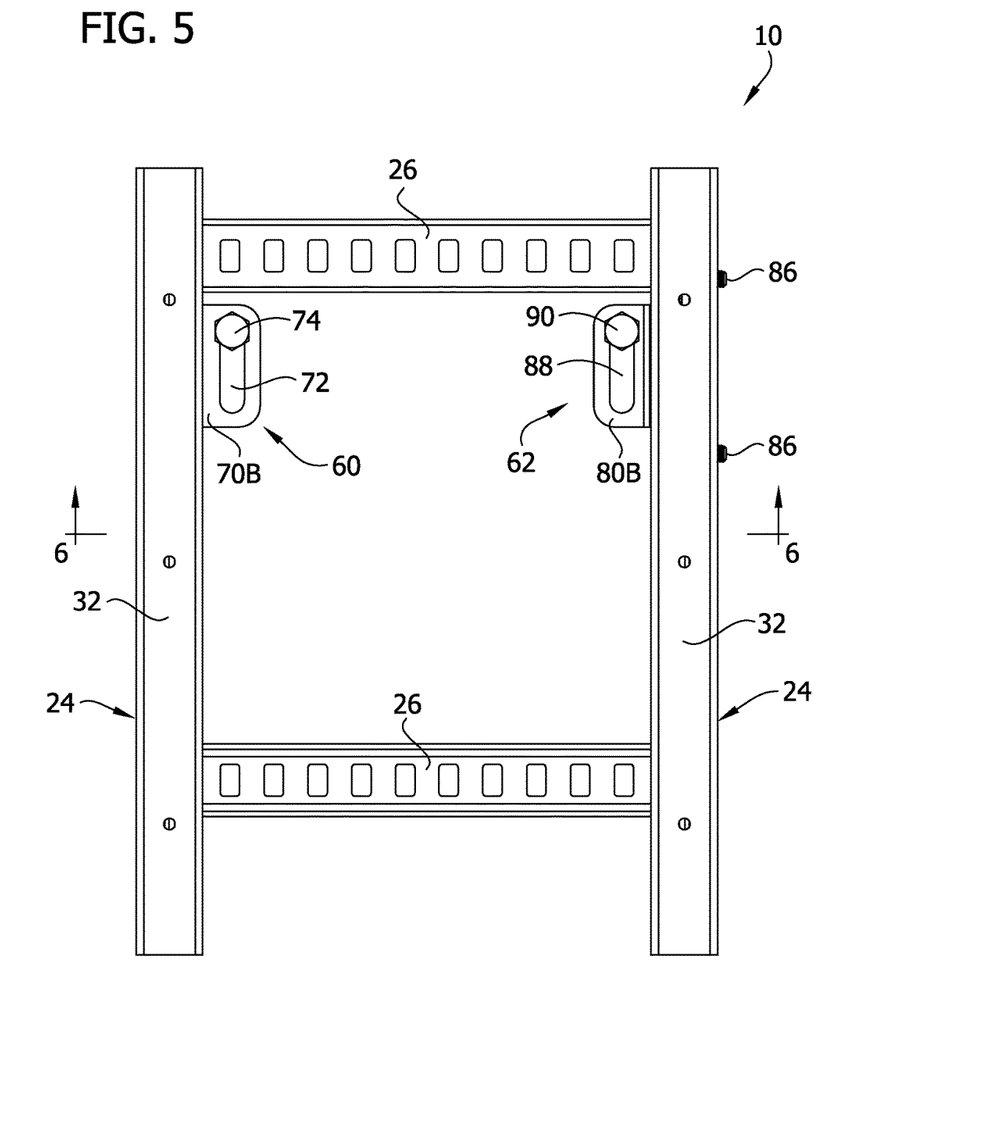
FIG. 5 is a top plan view of the cable tray assembly.
Figure 8:
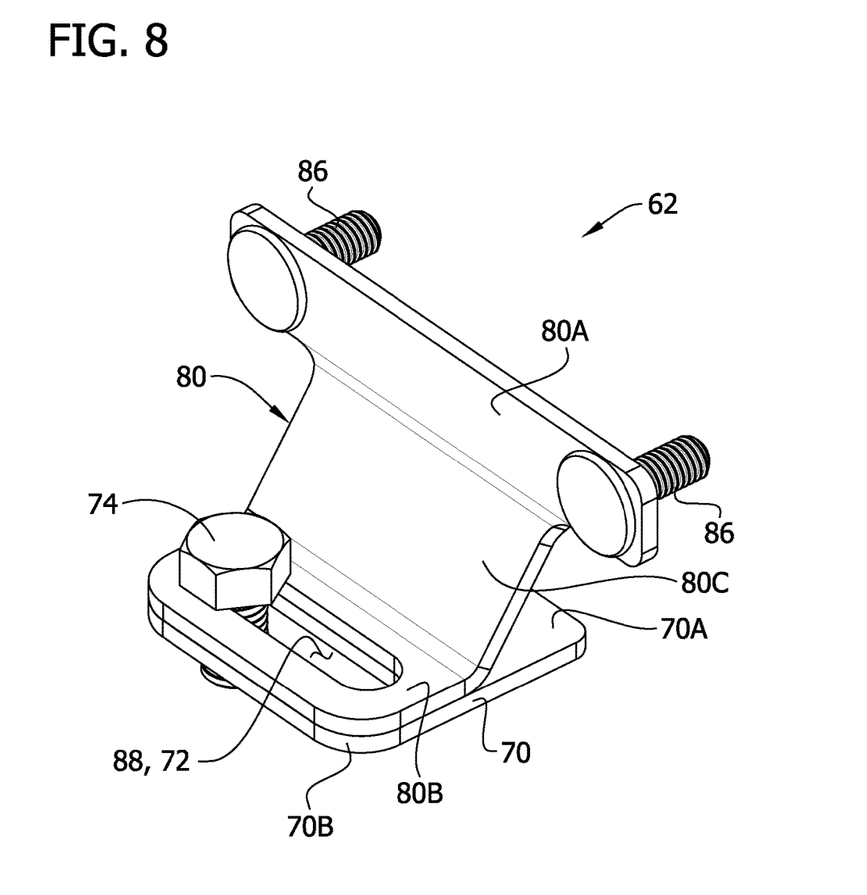
FIG. 8 is an enlarged perspective of the second clamp device.

Referring to FIGS. 3, 4 and 6, each second clamp device 62 includes the clamping plate 70 of the first clamp device (or another clamping plate) and a web bracket (or gusset), generally indicated at 80, interconnecting the rail web 30 to the clamping plate 70. The teachings set forth above with respect to the first clamping plate 70 of the first clamp device, including the dimensions of the clamping plate, the clearance C between the clamping plate and the channel 50, and the depth at which the clamping plate is inserted into the channel, apply equally to the clamping plate of the second clamp device 62. As described above with respect to the first clamp device 60, the clamping plate 70 includes a first side portion 70A received in the channel 50 and a fastener opening 72 in a second side portion 70B inward of the toe portion 46 of the rail 24. As also shown in FIG. 8, the web bracket 80 includes a web-securement portion 80A, a clamping-plate-securement portion 80B, and an angled portion 80C extending between the web-securement portion and the clamping-plate-securement portion. The web-securement portion 80A defines at least one fastener opening 84 (e.g., two fastener openings) and is in face-to-face engagement with the inboard side of the web 30 above the bead 52. Referring to FIGS. 3 and 4, the web-securement portion 80A is secured to the web 30 by at least one fastener 86 (e.g., two bolts) extending through the fastener openings 84 and at least one opening 87 (e.g., two openings) in the web that are at least partially aligned with respective fastener opening. The clamping-plate-securement portion 80B defines at least one fastener opening 88 (e.g., a slot-shaped opening extending lengthwise of the rail 24) and is in face-to-face engagement with the clamping plate 70 such that at least portions of the fastener openings 88 and 72 are generally aligned. At least one fastener 90 (e.g., a bolt) extends through the aligned fastener openings 88, 72 and is secured to the cable tray support 66. The angled portion 80C of the web bracket 80 may extends at an acute angle (e.g., from about 30-60 degrees, such as 45 degrees) relative to a vertical center plane Vp (FIG. 6) of the cable tray assembly 10. In the illustrated embodiment, the web bracket 80 and the clamping plate 70 of the second clamp device 62 are formed separately and secured to one another by the fastener(s) 90.

Figure 10:
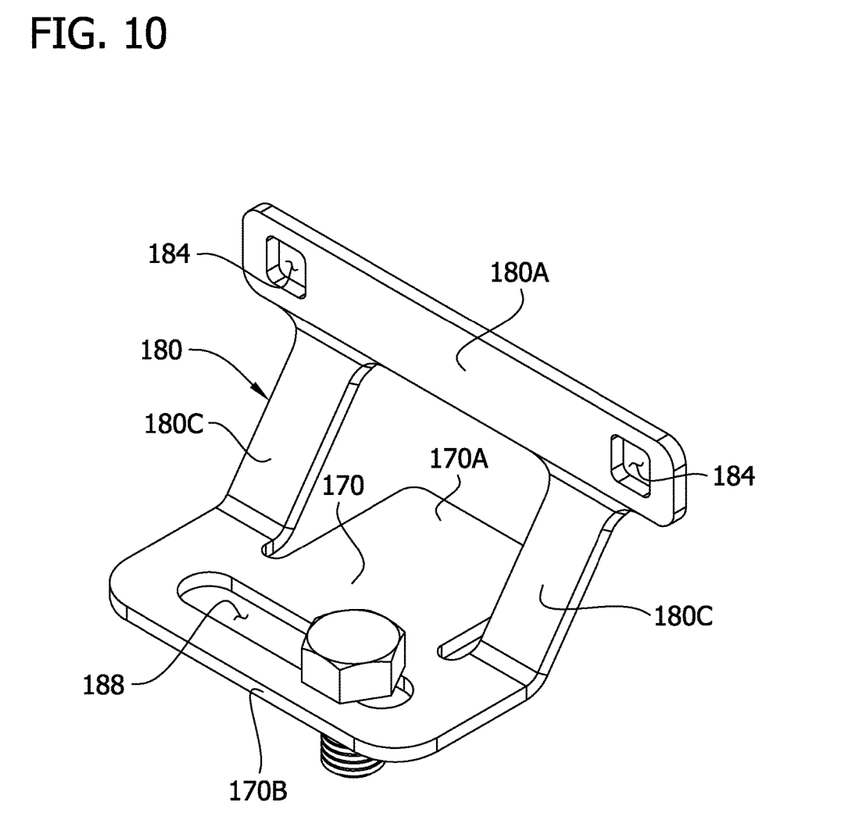
FIG. 10 is a perspective of another embodiment of the second clamp device.
Figure 11:
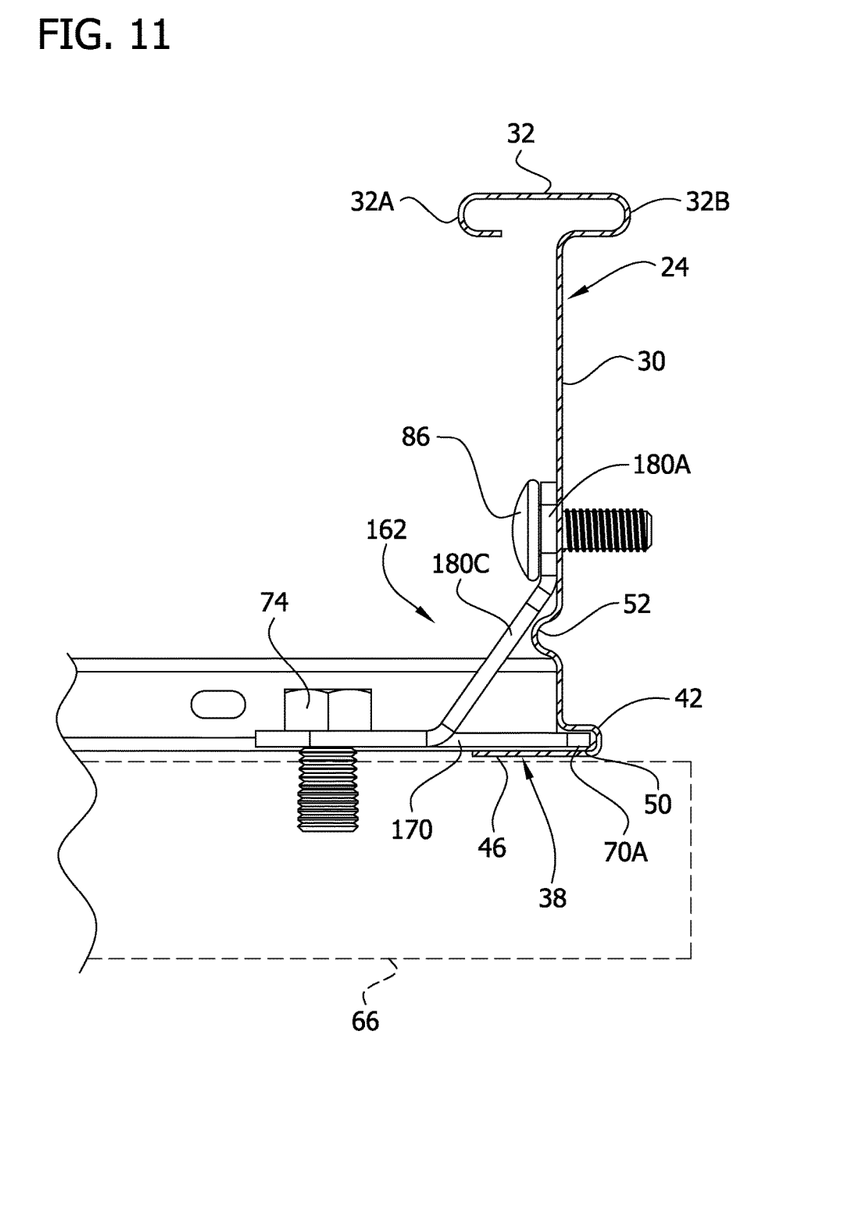
FIG. 11 is similar to FIG. 6, except showing an enlarged view of the second embodiment of the second clamp device installed on the cable tray.

Referring to FIGS. 10 and 11, in a second embodiment the second clamp, indicated generally at 162, is integrally formed as a single, one-piece component. For example, the second clamp 162 may be formed from a single sheet of metal, such as by stamping. In the illustrated embodiment, the clamp device 162 includes a clamping plate 170 and a web bracket (or gusset), generally indicated at 180, interconnecting the rail web 30 to the clamping plate 70, as shown in FIG. 11. The teachings set forth above with respect to the first clamping plate 70 of the first clamp device, including the dimensions of the clamping plate, the clearance C between the clamping plate and the channel 50, and the depth at which the clamping plate is inserted into the channel, apply equally to the clamping plate of the second embodiment of the second clamp device 162. As described above with respect to the first clamp device 60, the clamping plate 170 includes a first side portion 170A received in the channel 50 and a fastener opening 172 in a second side portion 170B inward of the toe portion 46 of the rail 24. As also shown in FIG. 10, the web bracket 180 includes a web-securement portion 180A and an angled portion or arms 180C extending between the web-securement portion and the clamping plate 170. The web-securement portion 180A defines at least one fastener opening 184 (e.g., two fastener openings) and is in face-to-face engagement with the inboard side of the web 30 above the bead 52. The clamping plate 170 may have a uniform thickness T measuring from about 3.5 mm to about 4.2 mm, such as about 4.0 mm, so that the first side portion 170A fits snugly, and/or has an interference fit, within the channel 50. For example, a clearance C between an upper surface 170a of the clamping plate 170 and the inner surface 50a of the upper wall of the channel 50 may be between about 0.01 mm and about 1.70 mm.

Referring to FIG. 11, the web-securement portion 180A is secured to the web 30 by at least one fastener 86 (e.g., two bolts) extending through the fastener openings 184 and at least one opening 87 (e.g., two openings) in the web that are at least partially aligned with respective fastener opening. The clamping plate 170 defines at least one fastener opening 188 (e.g., a slot-shaped opening extending lengthwise of the rail 24), as shown in FIG. 10. At least one fastener 90 (e.g., a bolt) extends through the fastener opening 188 and is secured to the cable tray support 66. The angled portion 180C of the web bracket 180 may extends at an acute angle (e.g., from about 30-60 degrees, such as 45 degrees) relative to a vertical center plane Vp (FIG. 6) of the cable tray assembly 10.

In one embodiment of a method of use, a plurality of second clamp devices 62, 162 (e.g., the first embodiment, the second embodiment, or a combination of the embodiments) clamp the rails 24 to the cable tray support 66 at uniform intervals lengthwise of the cable tray assembly 10. For example, the second clamp devices 62, 162 may be spaced at uniform intervals measuring about 3 m to 6 m lengthwise of the corresponding rail 24. The second clamp devices 62, 162 may be spaced at other uniform intervals or at non-uniform intervals lengthwise of the rail 24. In one embodiment, the second clamp devices 62, 162 may be spaced at intervals sufficient to increase the load bearing capacity of the cable tray assembly 10 compared to an identical cable tray assembly that does not include the first clamp devices. The second clamp device 62, 162 increases the load-bearing capacity of the cable tray assembly 10 in three ways: 1) the clamping plates 70, 170, by virtue of the clamping plates being received in the channel 50, inhibit crushing or compression of the bottom channel portion 38 (i.e., narrowing of the channel 50) when a load is applied to the cable tray assembly; and 2) the clamping plates, by virtue of the clamping plates being secured to the supports 26, rigidify the rails to retain the heightwise axis H (FIG. 9) of the rails (e.g., vertical axes) at orthogonal or perpendicular angles relative to the plane S (FIG. 9) in which the supports 66 lie (e.g., a horizontal plane extending between the two rails); and 3) the web bracket 80, 180 distributes some of the load applied to the cable tray assembly to the webs 30 of the rails. Moreover, the clamping plates 70, 170 are retained in the channels 50 and are inhibited from slipping out of the channel by virtue of the clamping plates being secured to the supports.

In one example, a cable tray assembly constructed according to the principles of the present disclosure included the rails 24 of 316 stainless steel having a thickness of 1.2 mm, the rungs 26 spaced apart at uniform intervals of about 300 mm, and the second clamp devices 62, 162 spaced apart at uniform intervals of about 3 m. This assembly was rated to have a load bearing capacity of 380 kg/m using IEC 61537 test type II. An identical cable tray assembly that did not include the first clamp devices 60 was rated to have a load-bearing capacity of 250 kg/m using IEC 61537 test type II.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A cable tray assembly having a length and a centerline extending lengthwise of the assembly, the cable tray assembly comprising:
    a pair of generally parallel rails extending lengthwise of the cable tray assembly, each rail having a vertical web and a bottom channel portion at a lower end of the web, the bottom channel portion includes a heel portion projecting laterally outward from the vertical web, and a generally horizontal toe portion projecting laterally inward from the heel portion to a location inboard of the vertical web, the heel portion and toe portion defining a channel extending lengthwise of the rail and generally facing the centerline of the cable tray assembly;
    a plurality of rungs extending between the rails and spaced apart along the cable tray assembly, wherein the rungs are secured to inboard portions of the rails such that upper surfaces of the generally horizontal toe portions support the rungs; and
    at least one clamp device configured to secure one of the rails to a cable tray support, the at least one clamp device including a planar clamping plate having a first side portion received in the channel of said one of the rails and disposed outboard of the vertical web of said one of the rails, and a second side portion extending inboard of the toe portion of said one of the rails and configured to be secured to the cable tray support to clamp the bottom channel portion of said one of the rails to the cable tray support, wherein the planar clamping plate lies flat against the generally horizontal toe portion of the bottom channel portion of said one of the rails
    wherein the at least one clamp device further includes a bracket extending upward from the planar clamping plate and fastened to an inboard side of the vertical web to interconnect the planar clamping plate to the vertical web;

wherein the bracket includes a web-securement portion secured to the inboard side of the web, and an angled portion between the web-securement portion and the planar clamping plate;

wherein the bracket and planar clamping plate are formed as a single, one-piece component.

2. The cable tray assembly set forth in claim 1, in combination with the cable tray support supporting the cable tray assembly, wherein the second side portion of the clamping plate is secured to the cable tray support.

3. The cable tray assembly set forth in claim 1, wherein the second side portion of the planar clamping plate defines an opening for receiving a fastener to secure the planar clamping plate to the cable tray support.

4. The cable tray assembly set forth in claim 3, wherein the opening is a slot extending lengthwise of said one of the rails.

5. The cable tray assembly set forth in claim 1, wherein the bracket and planar clamping plate are separate, discrete components.

6. The cable tray assembly set forth in claim 5, wherein the bracket includes a planar clamping plate securement portion configured to be secured to the planar clamping plate.

7. The cable tray assembly set forth in claim 6, wherein the planar clamping plate securement portion defines an opening for receiving a fastener to fasten the bracket to the planar clamping plate.

8. The cable tray assembly set forth in claim 7, wherein the opening is a slot extending lengthwise of said one of the rails.

9. The cable tray assembly set forth in claim 1, wherein the web-securement portion includes at least one opening, the cable tray assembly further comprising a fastener received in the at least one opening and fastened to the inboard side of the vertical web of said one of the rails to secure the bracket to the vertical web.

* * * * *